Dec. 14, 1948. P. F. TREVOR 2,456,342
METHOD AND APPARATUS FOR DETERMINING THE APPROXIMATE
AMOUNT OF OIL FILM ON ARTICLES
Filed May 20, 1947
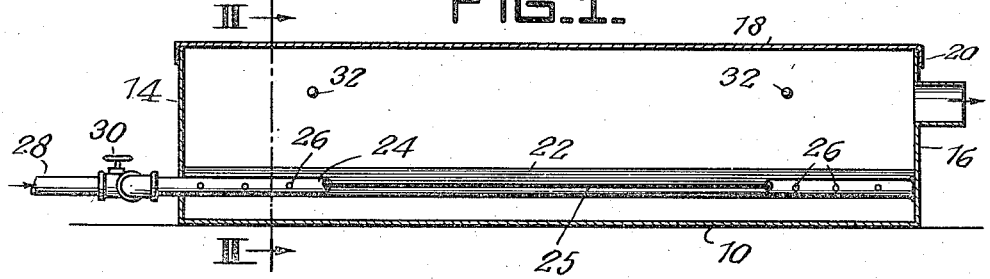
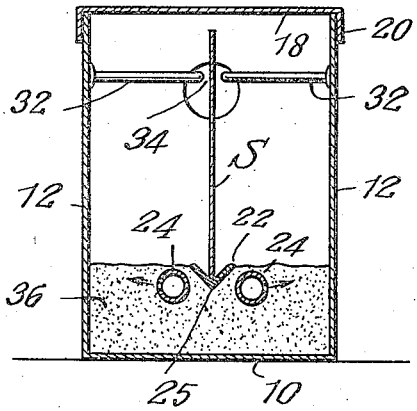
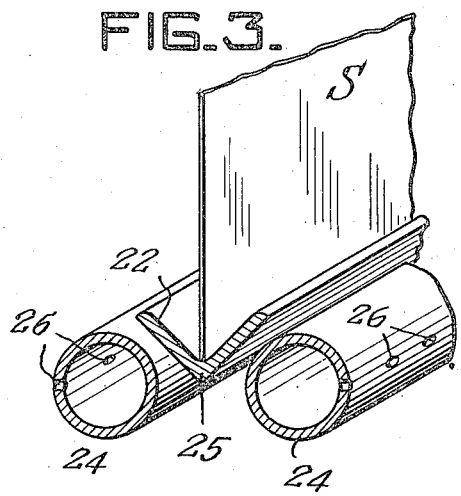
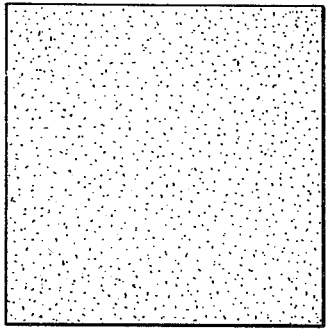
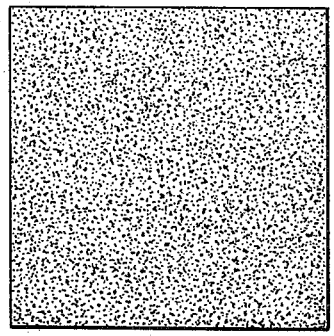
INVENTOR:
PAUL F. TREVOR,
BY: Donald G. Dalton
HIS ATTORNEY.

Patented Dec. 14, 1948

2,456,342

UNITED STATES PATENT OFFICE 2,456,342

METHOD AND APPARATUS FOR DETERMINING THE APPROXIMATE AMOUNT OF OIL FILM ON AN ARTICLE

Paul F. Trevor, Bessemer, Ala., assignor to Tennessee Coal, Iron and Railroad Company, a corporation of Alabama Application May 20, 1947, Serial No. 749,396

9 Claims. (Cl. 73—432)

This invention relates broadly to improvements in the method and apparatus for determining the approximate amount and distribution of a film-like body of oil on an article. While not limited thereto, the invention is peculiarly well-suited for rapidly determining the distribution and amount of thin oil films on ferrous tin plate coated electrolytically or by the hot-dip method, or on oiled black ferrous metal plate. It is known to those skilled in the art that extremely thin oil films of the order of about two to ten millionths of an inch in thickness are usually applied to such tin plate and black iron plate.

Prior to my invention the determination of the amount of oil film on the plate or other article required the extraction of the oil from an appreciable area of the plate (usually from 100 to 500 square inches), by use of an organic solvent and the subsequent separation of the solvent from the oil and weighing the oil. This practice is a relatively expensive and time-consuming method, the elapsed time required for the test frequently being in excess of three hours.

One object of the present invention is to greatly cut down the time required for such a test. Another object is to enable an operator to make a quick yet accurate approximation of the amount of oil film on a plate by visual examination and comparison with standard plates carrying definitely known amounts of oil film. Other objects and features of the invention will be more fully apparent from a consideration of the following detailed disclosure and the appended claims when read in connection with the accompanying drawings.

In the drawings:

Figure 1 is a longitudinal section through the apparatus;

Figure 2 is a transverse section on line II—II thereof;

Figure 3 is an enlarged fragmentary sectional detailed perspective;

Figure 4 is an elevation representing a standard sheet having a known amount of oil film thereon and a known amount of powdery material adherent to said oil film; and Figure 5 is a view similar to Figure 4 but showing a standard sheet assumed to have a relatively heavier coating of oil film and a correspondingly heavier coating of powdery material adherent thereto.

According to my improved method, in order to quickly determine the approximate amount and distribution of oil film on a metal sheet of tin plate or black iron plate, I create a fluid-borne suspension of comminuted oil absorbent material and permit it to precipitate or settle on an exposed surface or surfaces of the plate. I then compare the sheet, plate or other article with one of several previously prepared standard sheets, plates or articles of the same metal having a definitely known amount of oil film thereon of the same kind. The appearance of the oil absorbent material adhering to the sheets reveals the relative amounts of oil film thereon. Ordinary wheat flour or starch are suitable oil absorbent materials. The greater the amount of oil film on the test sheet, the greater the amount of flour or starch which will adhere thereto. The test sheet can be very quickly and easily compared with a plurality of standard sheets which have had definite amounts of oil applied and been subjected to precipitation of oil absorbent material.

Actual experience has shown that by my novel method described herein the test can be made in about three minutes. Obviously this is a great saving of time over the three hour period required by the previously known prior methods.

While I do not wish to be limited thereto, I have found in practice that the apparatus shown in the accompanying drawings is very effective in carrying out the method.

The apparatus illustrated comprises a container conveniently made of sheet metal having a bottom 10, upright sides 12—12 and upright ends 14 and 16 and a removable top cover 18 having marginal flange 20 adapted to overlap the sides 12 and the ends 14 and 16. Extending longitudinally of the container there is an angle bar 22 disposed with its vertex 25 downward and spaced above the bottom 10 of the container. Extending substantially parallel to the angle bar and located on each side thereof are pipes 24—24 each having a plurality of orifices 26 therein through which jets of air or other suitable fluids are adapted to be discharged. The pipes 24 are connected with a common supply pipe 28 leading to a source of compressed air or other fluid under pressure, and a valve 30 is provided to control the discharge of fluid jets from the orifices 26. Near the upper end of the sides 12—12 I mount laterally extending studs 32 of such length that there is a slight space 34 between their inner ends.

The plate or sheet S to be tested, having a relatively thin oil film thereon, is placed in the container after removal of the cover 18, the lower edge of the sheet resting in the right angular crotch of the angle bar 22 and the upper portion of the sheet being positioned in the space 34 between the laterally extending studs 32. A quantity of ordinary wheat flour, starch or other oil absorbent material, such as indicated by the stippling at 36, is placed in the container to a depth to cover the pipes 24. After the cover 18 has been replaced, the valve 30 is opened.

The discharge of air at a pressure of ten pounds per square inch from the orifices 26 for an interval of 20 seconds is effective to create an airborne suspension of the flour or other suitable comminuted material within the interior of the casing. Because of the presence of the oil film, many of the floating particles of flour, starch or the like adhere to the test sheet. The air valve is then shut off and the cover 18 removed from the casing. The top edge of the test sheet S may then be lightly tapped with a wooden mallet to dislodge any excess of the comminuted oil absorbent material. The sample S is then removed from the casing and is visually compared with a plurality of standard sheets, such, for example, as those illustrated pictorially in Figures 4 and 5. These standard sheets will generally be numbered or otherwise identified and each will have thereon a definitely determined or known amount or quantity of oil film of the same kind as that coating the sheet S under test and a definitely determined or known amount of flour, starch or other oil absorbent comminuted material adherent thereto of the same kind precipitated on the sheet S under test.

Practice demonstrates that, because the appearance of the dust-laden sheets varies with the amount of oil film thereon, a visual comparison of a test sheet S with several standards, such as shown in Figures 4 and 5, will permit a quick determination of the amount of oil film which is sufficiently accurate for most practical purposes. However, if desired, the comminuted material and the oil film can be removed from the sheet S and accurately weighed and this weight compared with the known weight of oil and comminuted material on the standard sheets, such as shown in Figures 4 and 5.

While I have described quite precisely a preferred sequence of method steps and the preferred form of apparatus which experience has shown to be highly desirable, the invention is not to be construed as limited thereto since various modifications may be made by those skilled in the art without departing from the spirit and scope of the invention as defined in the appended claims.

I claim:

1. The method of determining the approximate amount and distribution of oil film on an article which comprises causing a fluid-borne suspension of a comminuted oil absorbent material to precipitate on the exposed surface of the article, and comparing the thus treated article with a specially prepared standard article of the same kind, having a definitely predetermined amount of oil film thereon and a coating of the same kind of said comminuted oil absorbent material adherent thereto.

2. In the determination of the approximate amount and distribution of oil on a metal test sheet carrying an oil film, the method which comprises creating a fluid-borne suspension of comminuted oil absorbent material in an enclosure, placing the test sheet in the enclosure to allow such comminuted material to adhere to the oil film thereon and comparing the test sheet with standard sheets carrying predetermined amounts of oil and comminuted material of the same kind as that adhering to the test sheet.

3. The method which comprises placing an oil coated metal test sheet in an enclosure, discharging jets of air through a body of flour within the enclosure so as to cause the latter to precipitate on said oil coated test sheet and comparing the amount of flour so precipitated with several standard sheets, each carrying a definitely known amount of oil film of the same kind as that on the test sheet and a definitely known amount of flour of the same character as that precipitated on the test sheet.

4. The method of determining the approximate amount and distribution of oil film on a metal sheet which comprises causing an air-borne suspension of comminuted oil absorbent material to contact said sheet and to be thus precipitated on the exposed surface thereof, and visually comparing the sheet with several standard sheets, each having a predetermined amount of the same kind of oil film thereon and each having the same kind of comminuted oil absorbent material adherent thereto as that precipitated on the first mentioned sheet.

5. The method of determining the approximate amount and distribution of an oil film on a metal sheet which comprises providing a body of flour within an enclosure, positioning a sheet in juxtaposition thereto within said enclosure, blowing jets of air through said flour so as to precipitate some of it on the oil film carried by the sheet and comparing the amount of thus precipitated flour with several like metal standard sheets, each having a definitely predetermined amount of oil thereon and flour adherent thereto.

6. The method of determining the approximate amount and distribution of an oil film on a metal sheet under test which comprises providing a body of comminuted oil absorbent material within an enclosure, positioning said test sheet in juxtaposition to said material within the enclosure, blowing the material within the enclosure so as to precipitate some of said material on the oil film carried by the sheet, removing the oil impregnated comminuted material from the sheet and comparing its weight with that of the amount of the same kind of said comminuted material which has been precipitated on a known amount of oil carried by a standard sheet of the same kind of metal as said test sheet.

7. An apparatus for determining the amount and distribution of oil film on an article comprising a container adapted to enclose the article, means for supporting the article within the container above a body of comminuted oil absorbent material adpted to be held in the lower part of the container and means for discharging jets of air through said comminuted material so as to precipitate it on the exposed surface of said article.

8. An apparatus for determining the amount and distribution of oil film on a metal sheet comprising a container adapted to enclose the sheet, means for supporting the sheet on edge in upright position within the container above a body of comminuted oil absorbent material adapted to be held in the lower part of the container and means for discharging jets of fluid through the comminuted material so as to create an air-borne suspension of the material and precipitate such material on the exposed surface of the sheet.

9. An apparatus for determining the amount and distribution of oil film on an oil coated metal sheet comprising a container adapted to enclose the sheet, an angle bar having its vertex disposed downwardly so that the upwardly diverging flanges thereof coact to position the lower edge of the sheet, members extending laterally inward from the upper portion of the container walls, the inner ends of said members being spaced apart a sufficient distance to position the upper portion of the sheet, perforated pipes connected with a source of air pressure, said pipes being positioned in the lower part of said container whereby, when the container is supplied with comminuted oil absorbent material, the air discharged from the pipes creates an air-borne suspension of said comminuted material so as to precipitate some of the material on the oil film carried by said sheet.

PAUL F. TREVOR.

REFERENCES CITED

The following references are of record in the file of this patent:

UNITED STATES PATENTS

| Number | Name | Date |
| --- | --- | --- |
| 2,112,304 | Rhed | Mar. 29, 1938 |
| 2,302,224 | Jones | Nov. 17, 1942 |
| 2,349,699 | Boor | May 23, 1944 |